United States Patent

Binot et al.

[11] Patent Number: 5,770,091
[45] Date of Patent: Jun. 23, 1998

[54] METHOD OF PLAIN SEDIMENTATION AND PHYSICAL-CHEMICAL SEDIMENTATION OF DOMESTIC OR INDUSTRIAL WASTE WATER

[75] Inventors: Patrick Binot, Bussy Saint Martin; Valéry Ursel, Saint Maurice; Michel Badard, Clamart, all of France

[73] Assignee: Omnium de Traitement et de Valorisation, France

[21] Appl. No.: 703,548

[22] Filed: Aug. 27, 1996

[30] Foreign Application Priority Data

Sep. 21, 1995 [FR] France .................................. 95 11100

[51] Int. Cl.⁶ .................................................... C02F 1/56
[52] U.S. Cl. ......................... 210/711; 210/713; 210/714; 210/727; 210/738; 210/921
[58] Field of Search ..................... 210/711, 713, 210/714, 723, 726, 727, 738, 747, 787, 921

[56] References Cited

U.S. PATENT DOCUMENTS 3,350,302 10/1967 Demeter et al. ........................ 210/711
4,927,543 5/1990 Bablon et al. ........................... 210/711
4,997,573 3/1991 Browne ................................... 210/714

FOREIGN PATENT DOCUMENTS

0 680 933 A1 4/1995 European Pat. Off. .
WO 95/11355 4/1995 WIPO .

*Primary Examiner*—Peter A. Hruskoci
*Attorney, Agent, or Firm*—Vanophem Meehan & Vanophem, P.C.

[57] ABSTRACT

An untreated flow of waste water is normally introduced into a plain sedimentation unit during plain sedimentation periods to separate it into sand and a flow treated by plain sedimentation. During other periods, for example periods of heavy rain, a coagulating agent, ballast sand and a flocculating agent are introduced. The coagulated flow is passed into a maturation intermediate area and then, with substantially all the sand and colloids of particles attached to it, into the plain sedimentation unit. Here effluent is separated by plain sedimentation and evacuated and sludge made up of the sand and the adhering colloids and particles is extracted and evacuated via an extraction system and the sand outlet channel of the plain sedimentation unit. The sludge is collected, the ballast sand is separated from it to be recycled into the sand injection area and the sludge and excess sand are extracted.

23 Claims, 5 Drawing Sheets

METHOD OF PLAIN SEDIMENTATION AND PHYSICAL-CHEMICAL SEDIMENTATION OF DOMESTIC OR INDUSTRIAL WASTE WATER

BACKGROUND OF THE INVENTION

1. Field of the Invention

The object of the invention is to implement, in a single compact structure, plain sedimentation, possibly in conjunction with degreasing, of domestic or industrial waste water at relatively low flowrates, for example in dry weather or when there is little rainfall, and an additional function of ballasted physical-chemical sedimentation at relatively high flowrates, such as in times of heavy rain.

2. Description of the Prior Art

Until recently, treatment plants in unitary networks receiving waste water and surface water have been sized to treat flowrates up to a maximum of approximately 2 to 2.5 times the mean flowrate in such networks in dry weather. Excess flow in rainy weather has usually been returned to the natural environment without treatment, by means of spillways in the network or at the entry to the treatment station, either upstream or downstream of the plain sedimentation unit.

Waste water treatment plants conventionally include a screening stage, a plain sedimentation (or even degreasing) stage and one or more treatment stages (primary, secondary, possibly tertiary).

Given the high amounts of pollution contained in waste water in rainy weather it is now regarded as necessary, within reasonable economic limits, to treat such excess waste water in times of heavy rainfall before returning it to the environment, to limit environmental damage due to rain.

As biological processes are not easily able to accommodate wide variations in the concentration of pollutants to be treated, peaks in rainy weather are treated biologically only up to a flowrate in the order of two to three times the average flowrate in dry weather.

Beyond this, the excess is usually returned to the environment or treated by one of the following methods:

storage of excess flow refused by the network or the station during rainy weather, followed by redistribution to the station within a period in the order of 24 hours maximum after the rain stops, plain sedimentation or preferably physical-chemical sedimentation of effluents not treated biologically.

Like biological treatment, physical-chemical treatment is usually preceded by pretreatment of the effluent in which the effluent is raked or screened to remove relatively coarse materials in suspension (larger than a few millimeters) followed by plain sedimentation and degreasing, often in a combined plant, to remove particles having a diameter greater than approximately 200 $\mu$m and floating grease.

New ballasted sedimentation techniques, in particular those using microsand, as described in U.S. Pat. No. 4,927,543 and U.S. patent application Ser. No. 8/431,833, have made physical-chemical sedimentation highly attractive from the economic point of view for treating waste water during periods of heavy rain.

Nevertheless, the cost of a physical-chemical treatment and sedimentation plant is additional to that of the standard pretreatment plant (screening, degreasing, plain sedimentation, and to that of the standard treatment plant), and this significantly increases the cost of treatment, even though it is for use only during periods of heavy rain.

Some station operators or manufacturers may have individually considered the possibility of injecting reagent into the plain sedimentation plant, or on its upstream side, to decrease the concentration of carbon-containing pollution reaching an overloaded biological treatment unit on the downstream side of the plain sedimentation unit.

However, this cannot significantly increase the flowrate treated, since the maximum hydraulic loadings in a plain sedimentation plant, which are in the order of 70 m$^3$/m$^2$.h for plain sedimentation only and 15 to 20 m$^3$/m$^2$.h in combined degreasing and plain sedimentation, do not allow settling of the floc formed, which is insufficiently ballasted by the various particles and the sand introduced by the untreated waste water to produce a floc settling rate matched to these levels of hydraulic loading.

The object of the present invention is to render the physical-chemical sedimentation treatment of excess flow in times of rainy weather economically feasible and efficient. To this end it teaches that the processing be carried out directly in the structures normally used for plain sedimentation in dry weather or in times of light rain, by using the technique of sedimentation ballasted by recirculated sand.

SUMMARY OF THE INVENTION

To this end, the invention consists in a method of treating an untreated flow of waste water loaded with particles and/or with colloids wherein the untreated flow is normally introduced into a plain sedimentation unit during periods referred to as plain sedimentation periods in order to separate out therein a flow treated by plain sedimentation that is evacuated via an outlet channel to treatment stages and sand extracted by extraction means and evacuated via a sand outlet channel, wherein, during other periods known as physical-chemical treatment periods:

the untreated flow is caused to flow in a first or coagulation area in which a coagulating agent is mixed with the flow in controlled proportions, the coagulation area being maintained turbulent, ballast sand and a flocculating agent are introduced into the flow in successive or non-successive injection areas, the coagulated flow is caused to flow into a second or intermediate area that can include at least one of the injection areas and in which turbulence is produced to maintain the greater part of the ballast sand in suspension while colloids or particles collect around the sand, the flow with substantially all of the sand and the colloids or particles attaching thereto is caused to flow into the plain sedimentation/settling unit for separation by sedimentation of water that is evacuated via an outlet channel and sludge consisting of the sand and the attached colloids or particles which are extracted by the extraction means and evacuated via the sand outlet channel, and the sludge is collected, the ballast sand is separated from it for recycling into the sand injection area and the excess sand and sludge are extracted.

The invention also provides an installation for treating an untreated flow of waste water loaded with particles and/or colloids, including a plain sedimentation unit having an entry channel, a post plain sedimentation water outlet channel, sand extraction means and a sand outlet channel, and a physical-chemical treatment channel including:

a first or coagulation area on the upstream side of the plain sedimentation/settling unit and including an inlet channel connected to a source of coagulating agent and means for generating turbulence, a sand inlet channel connected to a supply of ballasting sand of closely controlled grain size, a flocculant inlet channel connected to a supply of flocculant, a second or intermediate area provided with turbulent agitator means to maintain the major part of the sand added to the flow in suspension, the sand and flocculant inlet channels discharging into or on the upstream side of the intermediate area, the plain sedimentation/settling unit with the sand extraction means, the intermediate area having an outlet communicating with the inlet channel of the plain sedimentation/settling unit, a water outlet channel, possibly the same as the water outlet channel after plain sedimentation, and a sand recycling channel connecting the sand outlet channel to the closely controlled grain size sand supply.

The theory of the invention resides in the combination, either within or near a plain sedimentation, and possibly a combined plain sedimentation/ degreasing unit of conventional type the following functions:

1 - Forming ballasted floc in a physical-chemical maturation preparation area on the upstream side of the plain sedimentation area.

This area has at least means for:

injecting a coagulant, such as ferric chloride or aluminum sulfate, on the upstream side of the unit, for example on the upstream side of an elbow bend of the network or on the upstream side of the screening stage, and for mixing and generating turbulence by mechanical or geometrical means;

injecting and mixing a flocculating agent, such as an organic polyelectrolyte, on the upstream side of the plain sedimentation area and on the downstream side of the coagulant injection means;

injecting and mixing a "microsand", i.e. a fine sand having a grain size typically less than approximately 350 $\mu$m, to ballast the floc formed by the above means.

The point of injection of the microsand may be anywhere on the upstream side of the plain sedimentation area proper, possibly in a dedicated injection tank on the upstream side of or in a floc maturation area.

In the maturation area, turbulence is generated to form and mature ballasted floc and to maintain the latter in suspension (or preliminary sedimentation of the heaviest elements) before sending it to the plain sedimentation area.

The agitation of the maturation area (embodying one or more tanks), which may be effected by mechanical means (agitators) or by injecting air, is typically maintained at a velocity gradient between 70 and 300 $s^{-1}$ (preferably between 150 and 250 $s^{-1}$). The tank bottom(s) are provided with means of evacuating any deposit if this is deemed to be necessary given the characteristics of the effluent to be treated and the conditions of use.

These means may be simple evacuation by pumping or by use of an air pump system ("air lift" using a bubble aspiration effect).

The evacuation means may be combined with sorting means which maintain the mass of sand ballasting the floc within optimum grain size limits (typically between approximately 80 and 350 $\mu$m, preferably between 150 and 250 $\mu$m).

The floc maturation tank preferably has an inlet chicane to prevent hydraulic short-circuits and into which the polymer and some or all of the sand for ballasting the floc may be injected.

The floc maturation tank may have on its upstream side one or more tanks in which the coagulant, the sand ballasting the floc and/or the polymer are injected and mixed, for example.

2 - Separating the ballasted floc by natural sedimentation of the floc in the area normally provided for plain sedimentation: during periods in which physical-chemical sedimentation is used, the aeration means usually included in the plain sedimentation unit (plain sedimentation/ degreasing unit) for maintaining the organic material in suspension (plain sedimentation) and for causing grease to float (degreasing) are turned off, for example if a predetermined set point flowrate threshold is violated, and the ballasted floc can settle in the plain sedimentation and/or degreasing areas at ascensional velocities of up to 130 m/h and above.

The settled ballasted floc is removed by conventional means specific to the plain sedimentation unit, for example a mechanical pump or air pump ("air lift") in a hopper or on a bridge running the length of the settling basin, or even by scraping it along the bottom into a recovery hopper.

All of the material that settles out (microsand ballast, organic material, sand and heavy deposits from the network) and is removed in this way is transferred with or without sorting it (for example by hydrocycloning or screening or floatation) and using transportation methods familiar to the person skilled in the art (in troughs in a flow of water, in pipes, etc.) to means implementing the third function (see below).

3 - Sorting the settled materials (organic materials, coarse sand and ballast sand to be recycled) and recycling the sand used to ballast the floc.

This function, which recycles the material used to ballast the floc, is in practice needed to maintain a sufficiently high concentration of ballasting material in the flocculation/ maturation tank to enable ballasting of the floc such that it can settle at high mirror rates (in excess of 30 m/h, and up to 130 m/h and above) in the plain sedimentation area.

This function can be implemented by any means familiar to a person skilled in the art for separating the following phases, in one or more stages:

ballast sand (sand with a grain size typically from 80 to 350 $\mu$m, preferably 150 to 250 $\mu$m);

coarse sand introduced by the network and having a grain size greater than approximately 250 to 300 $\mu$m, to be removed to ad hoc receiver units;

the flocculated organic material (sludge), which is:
either returned to the main network or to a separate network for treatment at the station,
or transferred to a sludge storage/treatment unit;

where applicable, coarse organic materials (leaves, fibrous material) for removal, for example to the same location as the screening residues.

This sorting/recycling function is preferably implemented in the following manner.

The mixture of settled materials extracted from the plain sedimentation area is pretreated, for example by hydrocycloning, to separate from it the sludge, organic materials and very fine sand to be evacuated and the sand which is normally evacuated in dry weather and is reprocessed in times of rainy weather, for example by hydrocycloning, possibly after dilution, in order to separate the coarse sand (grain size greater than approximately 250 $\mu$m) from the sand used as ballast (grain size between approximately 150 and 250 $\mu$m).

In periods of physical-chemical treatment, the separation operations can be effected by hydrocycloning but also by screening and/or centrifuging and/or separation using a fluidized bed and/or any other separation means familiar to the person skilled in the art.

The ballast sand, stored in an agitated tank, is redistributed in periods of physical-chemical treatment into the injection tank or directly into the maturation tank if the cost of the injection tank is to be saved (at the cost of a slight loss of depollution efficiency).

A loop for separating the coarse organic materials is provided at any point where these organic materials accumulate, for example the bottom of the maturation tank or the trough receiving the materials recovered from the bottom of the settling basin.

This loop can separate the coarse sand by intermediate screening using a 1 to 10 mm, preferably 3 to 5 mm mesh, for example.

Objects, features and advantages of the invention emerge from the following description given by way of non-limiting example with reference to the appended drawings.

DETAILED DESCRIPTION OF THE PREFERRED EMBODIMENT

Figure 3:
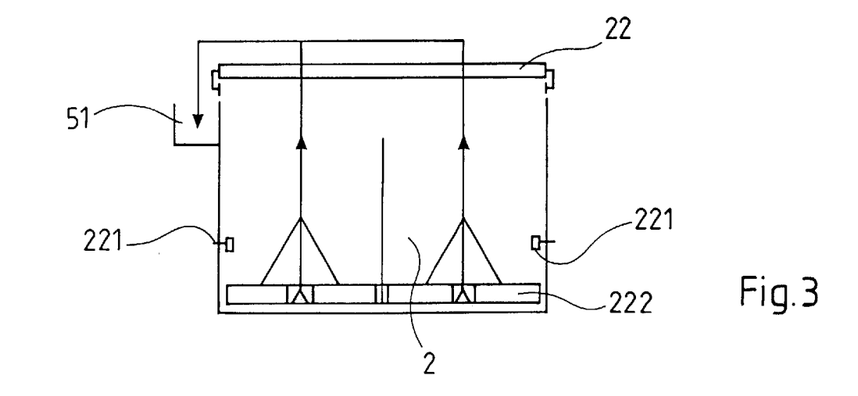
FIG. 3 is a view of the above installation in cross-section on the line III—III in FIG. 1.
Figure 4:
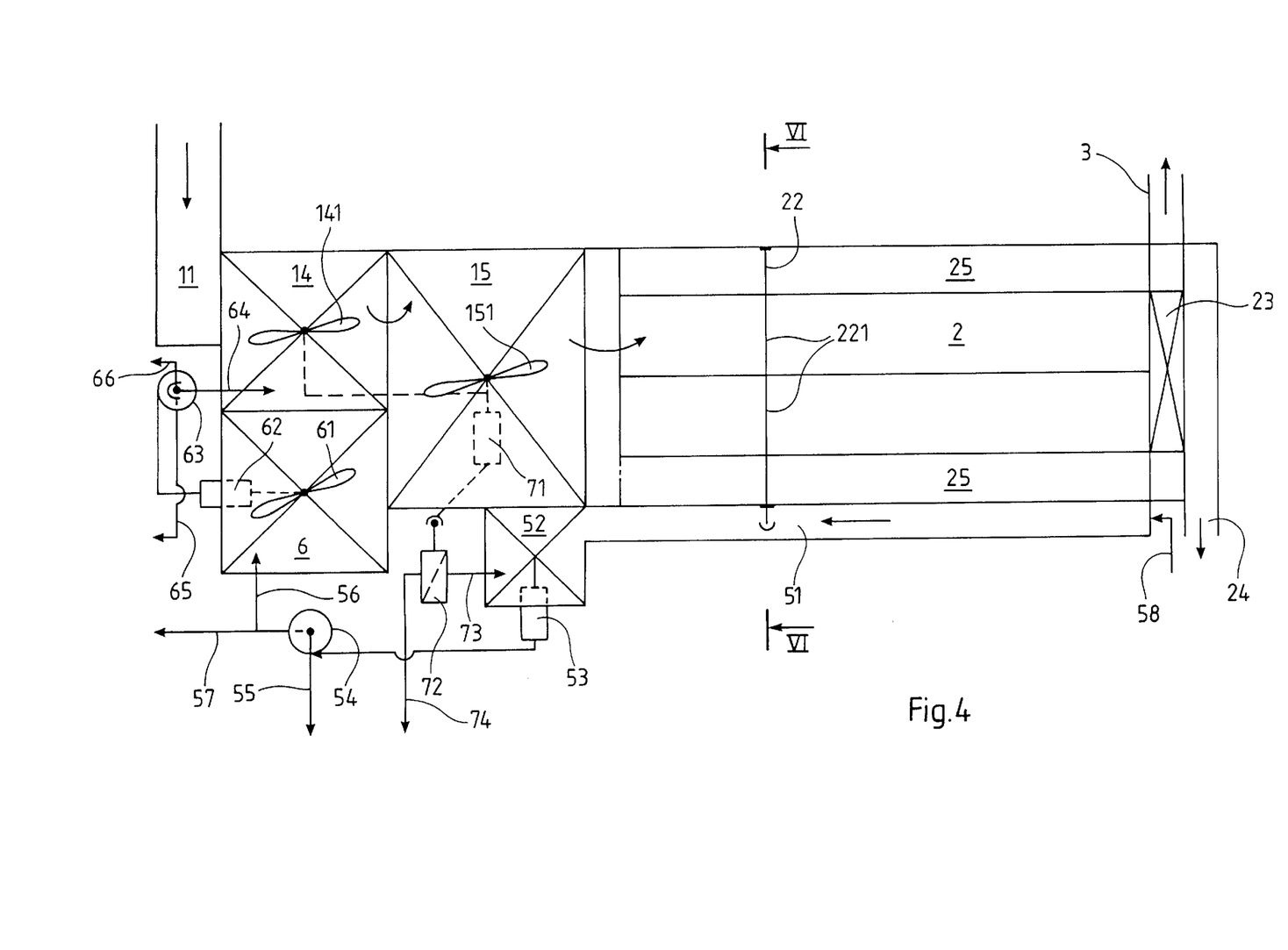
FIG. 4 is a plan view of another installation in accordance with the invention.
Figure 5:
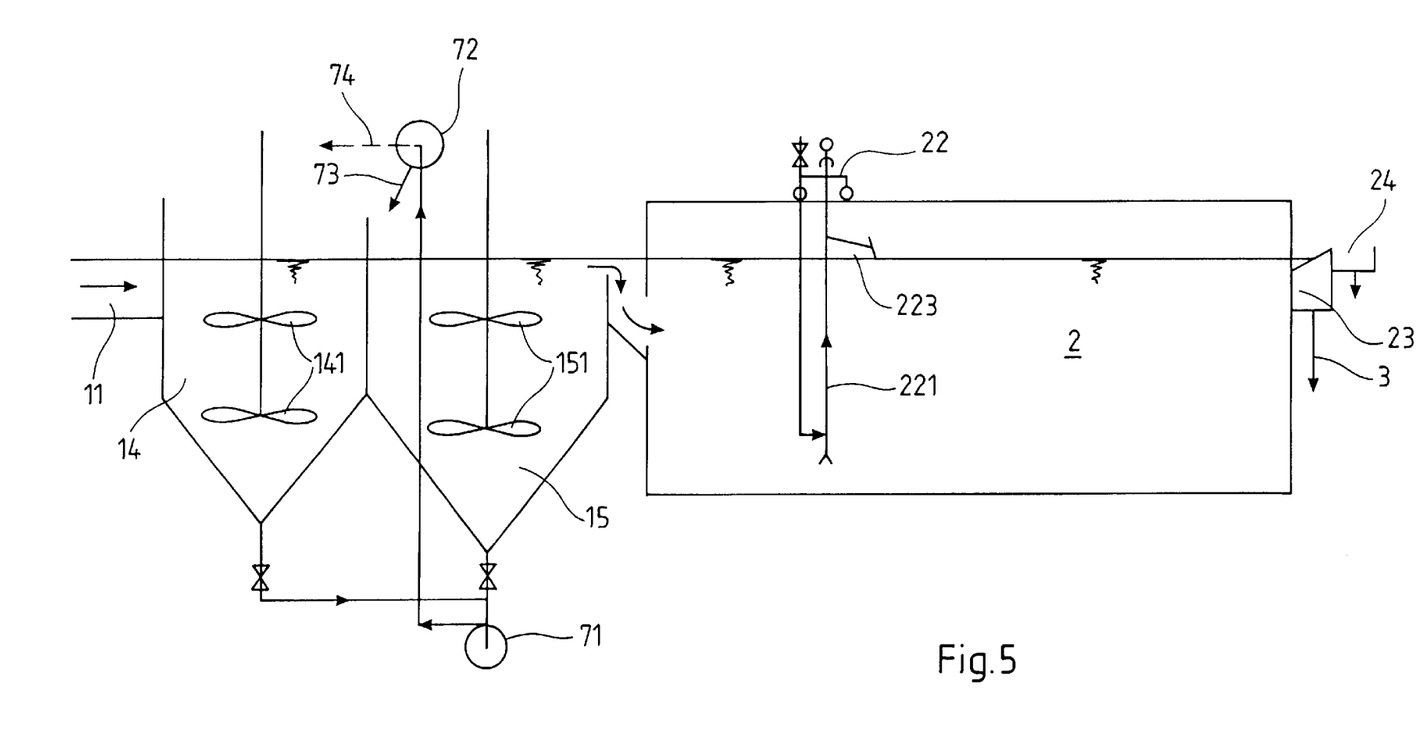
FIG. 5 is a view of this installation in longitudinal vertical section.
Figure 6:
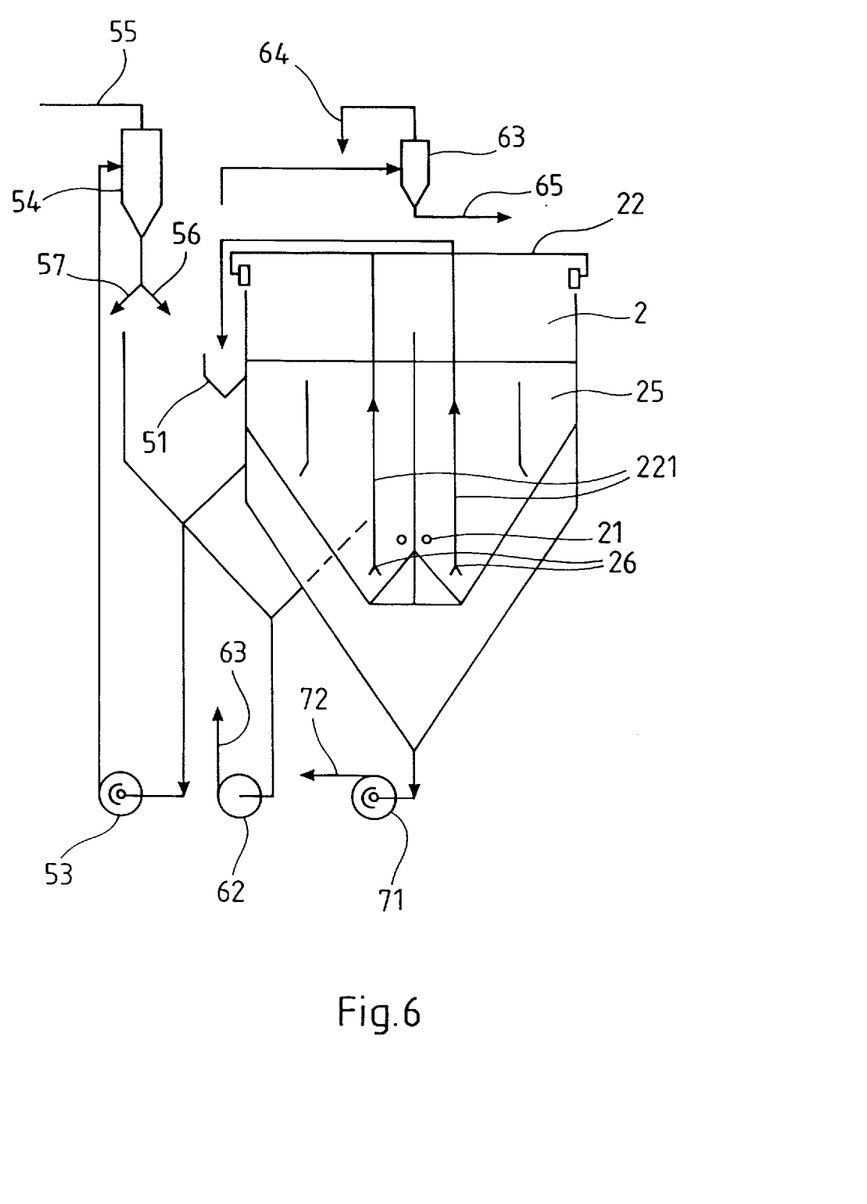
FIG. 6 is a view of this installation in cross-section on the line VI—VI in FIG. 4.

The installation of FIGS. 1 through 3 will first be described with reference to its operation in a period of only plain sedimentation (times of dry weather or light rain, for example), FIGS. 4 through 6 showing variants of this installation.

The screened but otherwise untreated waste water reaches the plain sedimentation-degreasing area 2 of a plain sedimentation-degreasing unit (that shown here being of the conventional rectangular shape) via a channel 11, an open shovel valve 12 and a channel 13.

Air bubbling means (bubble manifolds 21) cause grease to float to the surface, while materials in suspension are stirred in a turbulent manner in order to reduce the deposit of organic material in the plain sedimentation unit.

The water is removed from the plain sedimentation unit by way of a weir 232 and taken via a channel 3 to treatment stages that are not shown; the grease may be removed by a scraper 223 coupled to a travelling bridge 22 and which scrapes it into a grease and floating material conveyor 24.

The materials that settle out in the plain sedimentation unit (mainly sand and bonded or heavy organic materials) are scraped along the bottom by a scraper 222 towards air pump-air lift (or mechanical pump) means 221 and transferred into a evacuation trough 51 which has a sufficient slope to evacuate the mixture to the recovery tank 52.

The plain sedimentation unit can also have a flat bottom with scraping into one or more recovery trenches. It is also possible to use a plain sedimentation unit with V-shape channels 26 in the bottom, with recovery by a mechanical pump or air pump-air lift 221 on the travelling bridge, as shown in the FIG. 4 through 6 variants.

Similarly, the evacuation trough 51 can feature a flow of water 58 and/or bottom air bubbling to prevent the deposition of materials in transit.

The recovery tank 52 can also be provided with a mechanical or air injection agitator system, to maintain the materials in suspension and to begin separation of organic material bonded to the mineral materials.

The organic materials are finally separated from the sand using a pump 53 and hydrocyclone 54, which can be complemented or replaced by any of the other usual means of separating sand from organic materials, such as Archimedes screws or clarifiers with reciprocating rakes, for example.

The sand is then evacuated through an outlet 57, for example to a skip, and the organic materials are also evacuated by a line 55, possibly after screening and pressing, for example to the same location as the screening waste.

During periods of physical-chemical treatment (in times of heavy rain, for example), the operation is modified as follows.

The screened but otherwise untreated waste water has a coagulant added to it via a channel 80 discharging on the upstream side of the installation described, by injecting coagulant (trivalent metal salt, for example) on the upstream side of a hydraulic discontinuity causing mixing (the screening unit, for example) or into a coagulation tank (not shown) on the upstream side of the installation. Turbulence is generated to promote coagulation by (conventional) mechanical means such as agitators (not shown), hydraulic discontinuities (elbow bend, etc.), or any other appropriate means. The shovel valve 12 is closed and the coagulated waste water then passes into an agitated injection tank 14, for example over a weir, exploiting the fact that in practice the incoming flow level will have increased due to the heavy rain. In the injection tank 14, which is provided with an agitator 141, the coagulated waste water is intimately mixed with a granular material able to ballast efficiently the floc being formed.

The granular material is preferably sand with a closely controlled grain size maintained between approximately 80 and 350 $\mu$m, preferably less than 250 $\mu$m, fed from recycling means described below via a sand input line 64.

The coagulated waste water remains in the injection tank 14 for between about 30 seconds and one minute at peak flow, with a typical velocity gradient between approximately 100 s$^{-1}$ and 400 s$^{-1}$, preferably approximately 200 s$^{-1}$.

The coagulated waste water mixed with the sand passes from the bottom of the injection tank 14 into a maturation tank 15, which is agitated by an agitator 151 and where it remains for about 1 to 2 minutes at peak flow, with a velocity gradient typically between 70 and 300 s$^{-1}$, preferably in the order of 150 s$^{-1}$.

Flocculating reagent from a supply 90 is then added to the waste water to be treated in the injection tank 14 or in the maturation tank 15, or partly in each of the latter tanks, on the downstream side of injection of coagulant.

The floc is formed in the maturation tank, grows and is ballasted with sand. The flow of waste water to be treated then flows over a weir into the channel 13 and thence into the plain sedimentation unit 2. The air bubbling systems 21 installed in the latter are shut down to enable the ballasted floc to settle in a flow with an ascensional velocity of up to 130 m/h and above, preferably 100 to 130 m/h. The physical-chemical floc and the sand introduced by the untreated effluent having settled in the plain sedimentation unit—here shown with a flat bottom with scraper and air lift recovery, but that can be equipped with any other recovery means such as, for example, V-shape channels on the bottom with pump or air lift recovery as conventionally used in a plain sedimentation unit—are taken up by the scraper 222, the air lift 221 and fed into the evacuation or side trough 51, recovery tank 52, sand pump 53 and hydrocyclone 54 which separates the sludge, evacuated from the top, via the line 55 from the sand recovered from the bottom and transferred via line 56 into a sand tank 6 (here provided with an agitator 61).

The ballasting sand is fed by a sand pump 62 to a hydrocyclone 63 where it is separated from the coarse sand introduced by the untreated waste water (and evacuated via line 65). This sand is then recycled into the injection tank 14 via line 64.

A rack or screen 72 may be provided at a point on the recycling circuit where large materials and fibrous materials accumulate, to reduce the concentration of these materials in this circuit, from which they are evacuated via an outlet 74.

Figure 1:
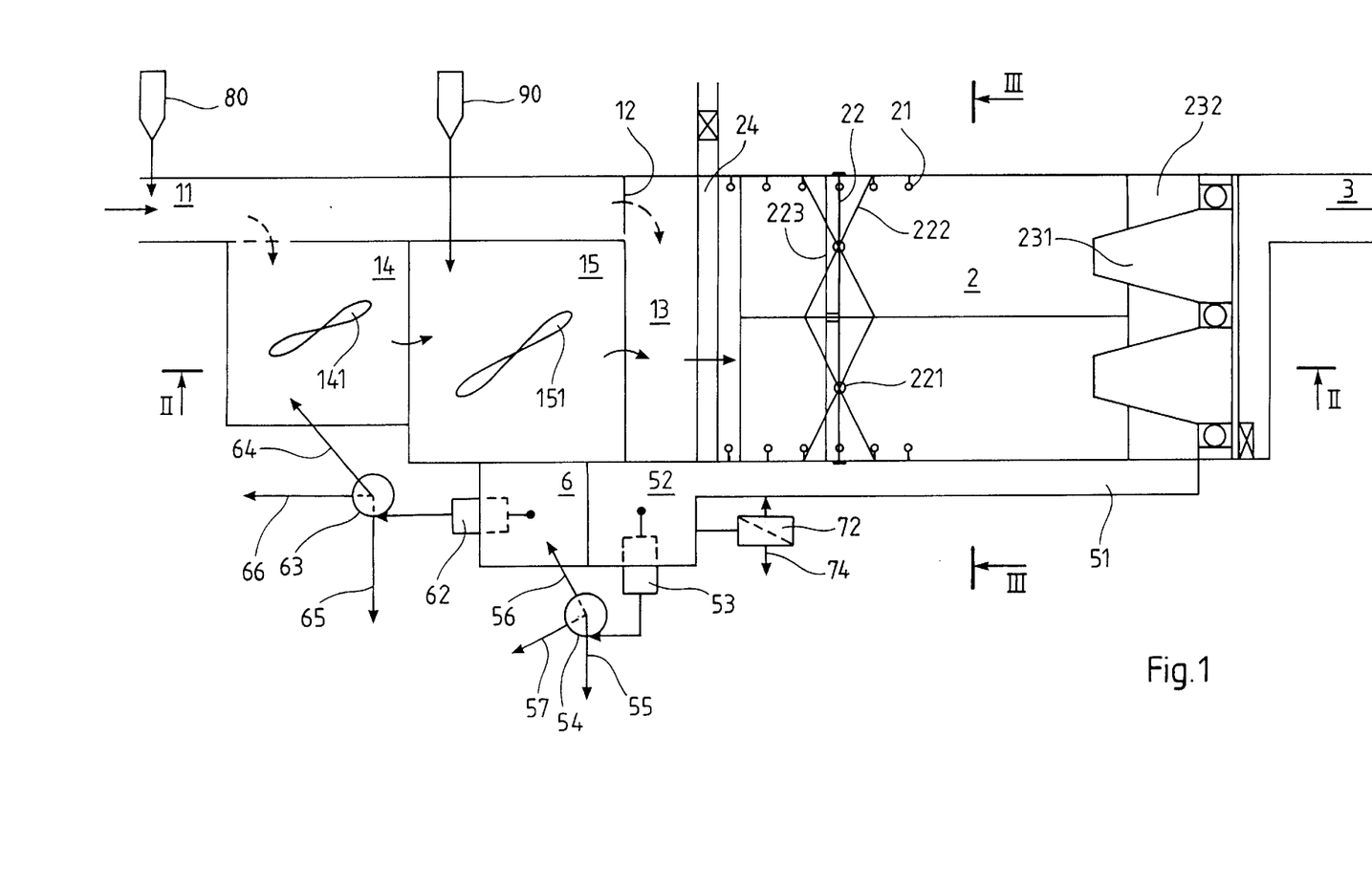
FIG. 1 is a diagrammatic plan view of an installation in accordance with the invention including a settling tank normally used prior to complete treatment.
Figure 2:
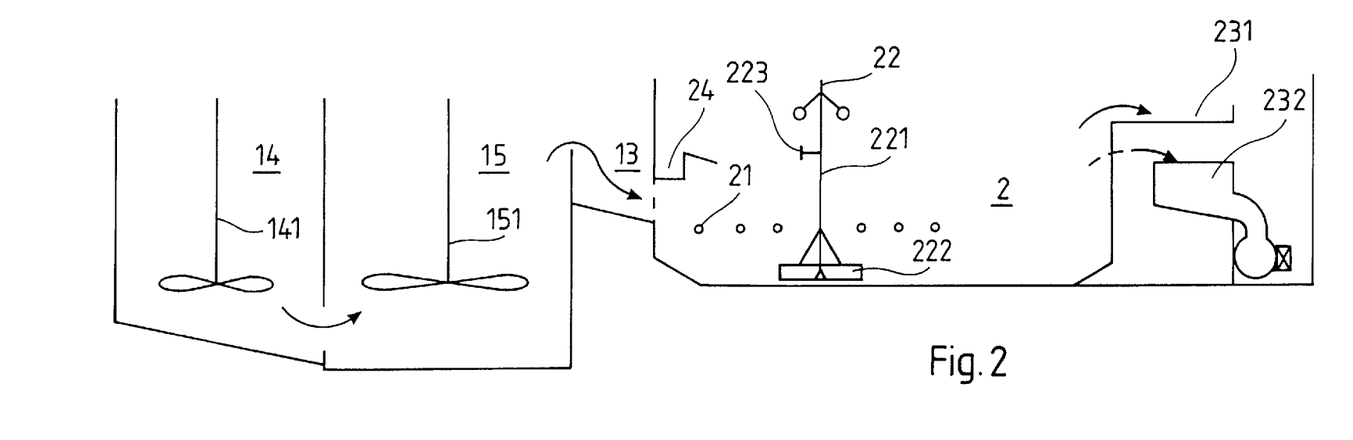
FIG. 2 is a view of the above installation in longitudinal vertical section on the line II—II in FIG. 1.

In the installation shown in FIGS. 1 through 3, the treated waste water is removed by means of a weir 231 at a level higher than the outlet level via the weir 232 in periods of plain sedimentation only, the weir 232 being shut off during periods of physical-chemical treatment in order to raise the level of the waste water for treatment by sedimentation and to adapt the hydraulic profile to the requirement of flow through the injection and maturation tanks 14 and 15 during physical-chemical treatment. These weirs advantageously discharge into the same water outlet channel, optionally provided at its downstream end with a distribution valve for evacuating materials that the normal treatment stages cannot handle. It is nevertheless possible for these weirs to be connected to different outlet channels, including a direct waste water evacuation channel for use in rainy weather, for example.

In the installation shown, the ballast sand is stored in one or other of the tanks 6, 14 and 15 during periods of plain sedimentation only, and all excess sand separated out by the hydrocyclone 54 is evacuated via the outlet 57 and/or 66.

Measures that are conventional in themselves (such as the agitator 61) maintain the stored sand in suspension or ensure a high velocity gradient when returned to suspension at the beginning of rainy weather (two-speed or servocontrolled variable speed motor drive with time-delays).

The following is a non-exhaustive list of possible variants:

the injection and maturation tanks can be provided with hoppers for extracting any floc and heavy materials introduced by the untreated waste water that settle out in them, as shown in FIGS. 4 through 6, which also show the possibility of installing the screen 72' fed by a pump 71' at the outlet from the coagulation and/or maturation tanks to separate coarse heavy materials (evacuated via line 74') and fibrous materials from the floc and sand transferred into the recovery hopper 52 via line 73', the waste water to be treated can be passed through the injection tank 14 and the maturation tank 15 during periods of plain sedimentation only and in periods of physical-chemical treatment, as shown in FIGS. 4 through 6; in this case, the treated waste water can also be recovered using a single weir 23 and the recovery of grease and floating materials by the scraper 223 and the grease or conveyor trough 24 is simplified by the reduced amplitude of variation of the level in the plain sedimentation unit, a different arrangement can be used for the means for separating the sludge, the ballast sand and the excess sand, for example by using the hydrocyclone 54 (or any other separator means relying on screening, centrifuging, fluidized beds or otherwise) to separate the excess sand (recovered from the bottom) and the mixture of sludge and ballasting sand to be recycled (recovered from the top), this mixture being subsequently separated into sludge to be evacuated and recycled ballast sand by the hydrocyclone 63.

Note that the installation described operates as a concentrator of sand having the grain size selected for ballasting the floc: the ballast sand loading is maintained by introducing sand into the waste water to be treated.

The parameters of the installation shown in FIGS. 1 through 3 and its operation are as follows, for example:

mean flowrate for plain sedimentation in dry weather or light rain: 1 000 m$^3$/h maximum flowrate accepted by downstream biological treatment station: 2 500 m$^3$/h maximum flowrate to be treated by physical-chemical sedimentation in the plain sedimentation unit during heavy rain: 8 000 m$^3$/h dimensions of the plain and physical-chemical sedimentation unit:

| | |
|---|---|
| Surface area: | 100 m$^2$ |
| Depth: | 4 m |

Plain sedimentation ascensional velocity:
at dry weather mean flowrate: 10 m/h
at maximum biological treatment flowrate: 25 m/h
at maximum physical-chemical sedimentation flowrate: 80 m/h volume of ballast sand injection tank: 125 m$^3$ volume of maturation tank: 250 m$^3$ coagulant: FeCl$_3$ injected before screening, upstream of the installation, at the rate of 60 mg/l of untreated waste water recirculated ballast sand: grain size between 100 and 250 μm, injected into the injection tank at the rate of 3 kg of sand per m$^3$ of untreated waste water flocculating agent: anionic polymer injected into the maturation tank at the rate of 1 mg/l of untreated waste water reduction of organic pollution between untreated and treated waste water leaving the unit after physical-chemical treatment:

| | |
|---|---|
| materials in suspension | >80% |
| chemical oxygen demand | >65% |
| phosphorus | >80% |

It goes without saying that the foregoing description has been given by way of non-limiting example only and that numerous variants may be determined by the person skilled in the art without departing from the scope of the invention.

There is claimed:

1. A method of treating a flow of untreated waste water containing particles, said method being capable of handling said flow during periods of a first predetermined flow and further being capable of handling a second predetermined flow in excess of said first predetermined flow, said method comprising the steps of:

introducing said flow of untreated waste water during periods of said first predetermined flow from an inlet channel having an open valve directly into a sedimentation unit;

treating said flow by means of sedimentation;

evacuating said treated flow through a first outlet channel;

closing said valve and introducing said flow of untreated waste water during periods of said second predetermined flow from said inlet channel into a coagulation area;

mixing a coagulating agent with said second predetermined flow, said coagulating agent being introduced in predetermined proportions;

maintaining turbulence within said coagulation area;

transferring said second predetermined flow into an intermediate area having at least one injection area;

injecting sand and flocculating agent into said intermediate area;

producing turbulence in said at least one injection area wherein said sand is suspended while said particles collect around said sand;

transferring said second predetermined flow into said sedimentation unit;

treating said second predetermined flow by means of sedimentation wherein a separation of an effluent and a sludge results;

evacuating said effluent through a second outlet channel;

collecting said sludge;

separating said sand from said sludge wherein said sand is recycled into said at least one injection area; and evacuating said sludge.

2. A method according to claim 1 wherein said step of injecting said sand and said flocculating agent further comprises injecting sand having an average grain size between approximately 80 and 350 μm.

3. A method according to claim 2 wherein said step of injecting sand having an average grain size between approximately 8 and 350 μm further comprises injecting sand having an average grain size between 150 and 250 μm.

4. A method according to claim 1 wherein said step of mixing said coagulating agent further comprises the steps of:

injecting said coagulating agent into said inlet channel; and creating turbulence to achieve rapid mixing of said second predetermined flow and said coagulating agent.

5. A method according to claim 1 wherein said step of injecting sand and flocculating agent further comprises the steps of:

injecting said sand into an injection tank;

transferring said second predetermined flow to a maturation tank included in said intermediate area; and injecting said flocculating agent into said injection tank.

6. A method according to claim 5 wherein said step of injecting said flocculating agent further comprises injecting said flocculating agent into said maturation tank, instead of said injection tank.

7. A method according to claim 5 wherein said step of injecting said sand and flocculating agent further comprises injecting said flocculating agent into said injection tank and said maturation tank.

8. A method according to claim 1 wherein said step of injecting said sand and said flocculating agent further comprises the steps of transferring said second predetermind flow into a maturation tank included in said intermediate area; and injecting both of said sand and said flocculating agent into said maturation tank.

9. A method according to claim 1 further comprising the step of removing said treated flow at a first outlet level and a second outlet level from said sedimentation unit at two different levels, said levels being isolated according to whether the method is only introducing said flow directly into said sedimentation unit or introducing said second predetermined flow into said intermediate area, said second outlet level for said step of introducing said second predetermined flow being higher than said first outlet for said sedimentation unit.

10. A method according to claim 9 wherein said step of separating said sand from said sludge further comprises the step of separating by means of hydrocycloning at both of said two different outlet levels.

11. A method according to claim 10 wherein said step of evacuating said effluent at said second outlet channel further comprises the steps of:

removing said effluent from a first hydrocyclone to separate a coarse sand;

subjecting said effluent to a second hydrocyclone to separate a fine sand;

recycling said fine sand into said at least one injection area; and recycling said coarse sand into said coagulation area.

12. A method according to claim 11 wherein said step of subjecting said effluent to a second hydrocyclone further comprises the step of separating organic sludge from said fine sand.

13. A method according to claim 1 wherein said step of separating said sand from said sludge further comprises the step of separating by means chosen from the group consisting of:

hydrocycloning, screening, centrifuging, fluidized bed separation means, or any combination thereof.

14. A method according to claim 1 further comprising the steps of storing said sand in a sand storage area having agitator means during periods of said first predetermined flow; and returning said sand into suspension during periods of said second predetermined flow.

15. A method according to claim 14 wherein said step of storing said sand in said sand storage area further comprises the step of storing said sand in said intermediate area.

16. A method according to claim 15 wherein said step of storing said sand in said intermediate area further comprises the step of storing said sand in said at least one injection area of said intermediate area.

17. A method according to claim 1 wherein said step of evacuating said effluent further comprises evacuating said effluent through said first outlet channel.

18. A method according to claim 17 wherein said step of evacuating said effluent through said first outlet channel further comprises the step of separating any particles larger than the grain size of said sand or any fibrous materials from said effluent.

19. A method according to claim 1 wherein said step of introducing said flow of untreated waste water directly into said sedimentation unit further comprises the step of limiting the velocity of said flow to a maximum between 25 and 75 m/h.

20. A method according to claim 1 wherein said step of transferring said flow of untreated wastewater during periods of said second predetermined flow into said sedimentation unit further comprises the step of limiting the velocity of said second predetermined flow to a maximum below 200 m/h.

21. A method according to claim 20 wherein said step of limiting the velocity of said second predetermined flow further comprises limiting the velocity to a maximum between 80 and 130 m/h.

22. A method according to claim 1 wherein said step of transferring said second predetermined flow into said intermediate area further comprises the step of limiting the velocity gradient of said second predetermined flow between 70 and 450 $s^{-1}$.

23. A method according to claim 22 wherein said step of limiting the velocity gradient of said second predetermined flow further comprises the step of limiting the velocity gradient of said second predetermined flow between 150 and 250 $s^{-1}$.

* * * * *